United States Patent
Ghabra et al.

(10) Patent No.: US 10,703,220 B2
(45) Date of Patent: Jul. 7, 2020

(54) CHARGE PORT AUTHORIZATION FOR ELECTRIC VEHICLES

(71) Applicant: Lear Corporation, Southfield, MI (US)

(72) Inventors: Riad Ghabra, Northville, MI (US); Aric Henderson Anglin, Rives Junction, MI (US)

(73) Assignee: Lear Corporation, Southfield, MI (US)

( * ) Notice: Subject to any disclaimer, the term of this patent is extended or adjusted under 35 U.S.C. 154(b) by 21 days.

(21) Appl. No.: 16/149,573

(22) Filed: Oct. 2, 2018

(65) Prior Publication Data

US 2020/0101849 A1 Apr. 2, 2020

(51) Int. Cl.
| | |
|---|---|
| *G08C 17/02* | (2006.01) |
| *B60L 53/65* | (2019.01) |
| *G06K 19/07* | (2006.01) |
| *H04W 12/06* | (2009.01) |
| *H01R 13/66* | (2006.01) |

(52) U.S. Cl.
CPC .......... *B60L 53/65* (2019.02); *G06K 19/0723* (2013.01); *G08C 17/02* (2013.01); *H04W 12/06* (2013.01); *B60L 2230/16* (2013.01); *G08C 2201/51* (2013.01); *H01R 13/6683* (2013.01)

(58) Field of Classification Search
USPC ....................................................... 320/109
See application file for complete search history.

(56) References Cited

U.S. PATENT DOCUMENTS

| | | | |
|---|---|---|---|
| 9,751,417 B2 | 9/2017 | Landau-Holdsworth et al. | |
| 2010/0185357 A1* | 7/2010 | Mizumachi | B60L 53/11 701/31.4 |
| 2010/0207588 A1* | 8/2010 | Lowenthal | B60L 11/1838 320/165 |
| 2011/0106329 A1* | 5/2011 | Donnelly | B60L 3/12 700/291 |
| 2012/0185379 A1 | 7/2012 | Tu | |
| 2012/0232761 A1* | 9/2012 | Charnesky | H01R 13/6272 701/49 |
| 2013/0049683 A1* | 2/2013 | Farkas | H02J 7/00 320/108 |
| 2013/0254097 A1* | 9/2013 | Marathe | G07F 15/005 705/39 |
| 2016/0075249 A1 | 3/2016 | Grabar et al. | |
| 2016/0229305 A1* | 8/2016 | Shumaker | G06F 21/34 |
| 2017/0015209 A1* | 1/2017 | Badger, II | B60L 53/305 |
| 2017/0223750 A1 | 8/2017 | Turner et al. | |

\* cited by examiner

*Primary Examiner* — Mohammed Alam
(74) *Attorney, Agent, or Firm* — Brooks Kushman P.C.

(57) ABSTRACT

A system and method for wirelessly authorizing access to a charge port for an electric vehicle is provided. The system may first establish a wireless communication link with a charging cord and then receive, from the charging cord, a wireless signal including a charging cord identifier. Upon verifying that the charging cord is authorized for use with the electric vehicle based on the charging cord identifier, a charge port door may be opened providing access to the charge port. A wireless communication link with a charging cord may be established using a challenge-response protocol like some passive entry systems. Alternatively, a wireless communication link may be established using radio-frequency identification (RFID) technology embedded in the charge port and the charging cord handle.

20 Claims, 3 Drawing Sheets

CHARGE PORT AUTHORIZATION FOR ELECTRIC VEHICLES

TECHNICAL FIELD

The present disclosure relates to a system and method for wirelessly authorizing access to a charge port in electrified vehicles.

BACKGROUND

The phrase "electric vehicle supply equipment" (EVSE) refers to devices for delivering energy from premises wiring to an electric vehicle. One type of EVSE device is a cord set. A cord set typically includes a power cord with a power plug, an EVSE control box, a charge cord, and a charge cord handle sequentially connected in series. Cord sets may be plugged in to an electrical outlet (e.g., 120 V or 240 V) using the power plug at one end. At the other end, the charge cord handle may be plugged into a charge port on an electric vehicle. Access to the charge port is typically provided through a charge port door much like the door to a fuel tank, such as gasoline.

SUMMARY

One or more embodiments of the present disclosure is directed to a method for wirelessly authorizing access to a charge port of an electrified vehicle. The method may include establishing a wireless communication link with a charging cord and receiving, from the charging cord, a wireless signal including a charging cord identifier. The method may further include verifying the charging cord is authorized for use with the vehicle based on the charging cord identifier and opening a charge port door in response to the charging cord identifier being associated with an authorized charging cord.

Establishing a wireless communication link with a charging cord may include transmitting, from the vehicle, a polling signal and receiving, at the vehicle, a response signal from the charging cord in response to the polling signal. The polling signal may be a low-frequency (LF) polling signal and the response signal may be an ultra high-frequency (UHF) response signal. Moreover, the polling signal used for authorizing access to the charge port may be the same as a polling signal used for a passive entry system. The response signal and wireless signal including the charging cord identifier may be part of a same signal transmission. The wireless signal, including the charging cord identifier, may include specific instructions instructing the vehicle to open a charge port door.

Alternatively, establishing a wireless communication link with a charging cord may include receiving, at the vehicle, a polling signal from the charging cord and transmitting, from the vehicle, a response signal to the charging cord in response to the polling signal. The method for wirelessly authorizing access to a charge port of an electrified vehicle may further include measuring the signal strength of the polling signal, wherein the response signal is sent in response to the signal strength exceeding a predetermined signal strength level.

As yet another alternative, establishing a wireless communication link with a charging cord may include detecting, using a coil antenna and a transponder in the charge port, a magnetic field from a charging cord handle having a transponder basestation. Further, opening the charge port door in response to the charging cord identifier being associated with an authorized charging cord may occur after the wireless communication link is broken signifying that the charging cord handle has been moved away from the charge port.

As yet another alternative, establishing a wireless communication link with a charging cord may include transmitting a continuous wave signal to the charging cord, wherein the wireless signal received from the charging cord is received by monitoring a modulation of the continuous wave signal by a transponder in the charging cord.

In yet another alternative embodiment, establishing a wireless communication link with a charging cord may include generating a magnetic field using a transponder basestation in the charge port and connecting to a charging cord handle having a transponder when the charging cord handle is range of the transponder basestation.

One or more additional embodiments of the present disclosure is directed to a charge port authorization system for a vehicle. The charge port authorization system may include a low-frequency (LF) transmitter configured to broadcast an LF signal. An ultra-high-frequency (UHF) transceiver may be configured to receive a UHF signal from a charging cord handle. The UHF signal may include a charging cord identifier. A controller may be configured to verify the charging cord is authorized for use with the vehicle to provide access to a charge port based on the charging cord identifier. Moreover, the controller may be configured to transmit a signal to a charge port module instructing the charge port module to open a charge port door in response to the charging cord identifier being associated with an authorized charging cord.

The LF signal may be a polling signal and the UHF signal may be a response signal configured to be received in response to the polling signal. Further, the polling signal used for authorizing access to the charge port may be the same as a polling signal used for a passive entry system.

One or more additional embodiments of the present disclosure is directed to another charge port authorization system for a vehicle. This system may comprise a charge port including a charge port door, a coil antenna, and a transponder. The system may further include a controller configured to establish a wireless communication link with a charging cord handle having a transponder basestation when the charging cord handle is near the charge port. The controller may be further configured to transmit a signal to a charge port module instructing the charge port module to open the charge port door after the wireless communication link is established.

The controller may be configured to transmit the signal to the charge port module instructing the charge port module to open the charge port door when the wireless communication link is broken. Moreover, the controller may be further configured receive a charging cord identifier from the transponder basestation in the charging cord handle and transmit the signal to the charge port module instructing the charge port module to open the charge port door in response to the charging cord identifier being associated with an authorized charging cord. The controller may also be configured to establish a communication link upon detecting, using the coil antenna and the transponder in the charge port, a magnetic field from the charging cord handle having the transponder basestation.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
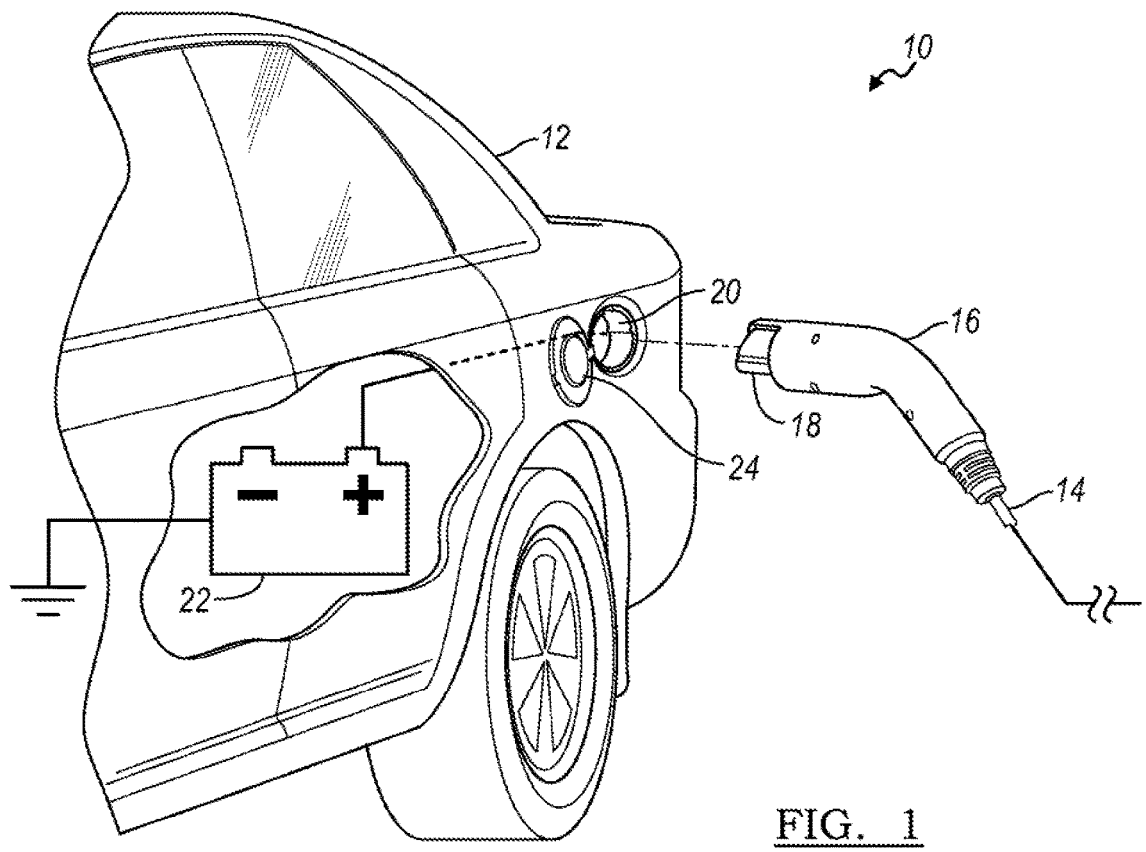
FIG. 1 is an environmental diagram of a charge port authorization system in accordance with one or more embodiments of the present disclosure.

Referring now to FIG. 1, an environmental diagram of a charge port authorization system 10 for an electric vehicle 12 in proximity to a charging cord 14 is shown in accordance with an embodiment of the present disclosure. The charging cord 14 may be part of an electric vehicle supply equipment (EVSE) assembly, such as a cord set or charging station, for delivering energy from premises wiring to the electric vehicle 12. The charging cord 14 may include a charging cord handle 16 with a connector plug 18. The electric vehicle 12 may include a charge port 20 to which the connector plug 18 of the charging cord 14 may be connected to charge a vehicle battery 22. A charge port door 24 may provide access to the charge port 20.

Figure 2:
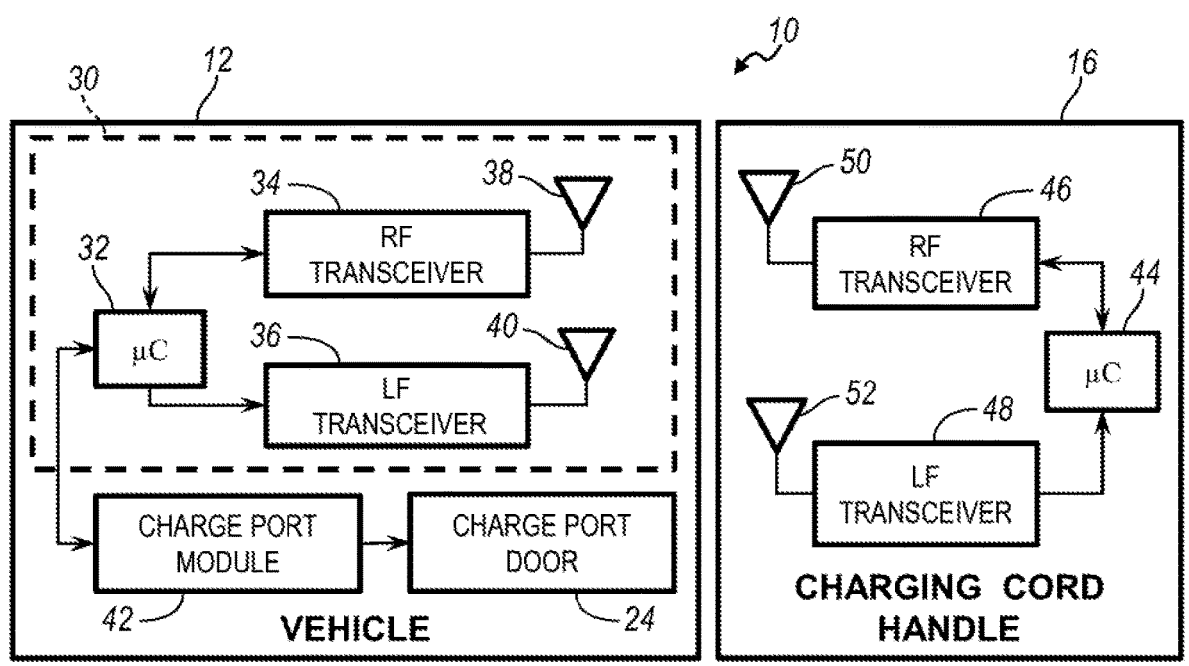
FIG. 2 is a block diagram of a charge port authorization system in accordance with one or more embodiments of the present disclosure.

FIG. 2 is a block diagram of the system 10 in accordance with an embodiment of the present disclosure. As shown, the electric vehicle 12 may include a base station or vehicle communication module 30 for communicating with a remote device, such as the charging cord handle 16. The vehicle communication module 30 may include a controller 32 coupled to multiple radio frequency (RF) devices, such as a radio frequency (RF) transceiver 34 and a low frequency (LF) transceiver 36. The RF transceiver 34 may be an ultra-high frequency (UHF) transceiver or the like. Though shown and described as transceivers, one or both the RF transceiver 34 and the LF transceiver 36 may be either a receiver only or a transmitter only, in accordance with one or more embodiments of the present disclosure. Thus, as used herein, the term "transceiver" should be interpreted to also include one-way communication devices such as transmitters and receivers. The RF transceiver 34 may be coupled to an RF antenna 38. Similarly, the LF transceiver 36 may be coupled to an LF antenna 40. A charge port module 42 may be coupled to the controller 32 for locking or unlocking the charge port door 24.

The charging cord handle 16 may include a controller 44 coupled to an RF transceiver 46 and an LF transceiver 48. Like the vehicle transceivers, one or both the RF and LF transceivers of the charging cord handle 16 may be either a receiver only or a transmitter only. Similarly, the RF transceiver 46 may be a UHF transceiver or the like. The RF transceiver 46 may be coupled to an RF antenna 50. The LF transceiver 48 may be coupled to an LF antenna 52 for detecting wakeup signals broadcast from the vehicle 12.

In at least one embodiment, the LF transceiver 36 in the vehicle 12 may be an LF transmitter configured to broadcast an LF signal. The LF signal may be a polling signal. The LF transceiver 48 in the charging cord handle 16 may be an LF receiver configured to receive the LF signal from the vehicle 12. The controller 44 in the charging cord handle 16 may measure the strength of the LF signal using, for example, Received Signal Strength Indication (RSSI). When the strength of the LF signal exceeds a predetermined threshold, the RF transceiver 46 may transmit an RF signal to the vehicle 12 with a command to open the vehicle charge port door 24. The RF signal in response to the LF polling signal may be a UHF signal. The RF signal may be made generic to every vehicle or specific to a particular vehicle for mating. For instance, the RF signal may include a charging cord identifier identifying the charging cord 14. The charging cord identifier allows a particular charging cord or handle to be mated to a particular vehicle. In this manner, access to a charge port by an unauthorized user or cord set may be prevented.

The RF transceiver 34 at the vehicle 12 may receive the RF signal from the charging cord handle 16 and the controller 32 may verify the charging cord 14 is authorized for use with the vehicle 12 based on the charging cord identifier. If the charging cord 14 is authorized, the controller 32 may transmit a signal to the charge port module 42 instructing the charge port module to open the charge port door 24. The charge port module 42 may be hardware or a combination of software and hardware for actively locking/unlocking the charge port door 24. Though shown as a separate module, the charge port module 42 may be part of the controller 32.

According to one or more embodiments, the polling signal used for authorizing access to the charge port 20 may be the same as a polling signal used for a passive entry system. Likewise, the RF (e.g., UHF) response signal from the charging cord handle 16 may be received on the same channel as a passive entry system. Accordingly, the vehicle communication module 30 may be the same as (or shared by) that of a passive entry system.

In another embodiment, the charging cord handle 16 may transmit an LF polling signal via the LF transceiver 48 acting as a transmitter. In this embodiment, the vehicle 12 may receive the LF polling signal via the LF transceiver 36, measure the signal strength of the LF polling signal, and transmit an RF response signal (e.g., UHF signal) via the RF transceiver 34 to the charging cord handle 16 when the signal strength exceeds a predetermined threshold. In response to receiving the RF response signal, the charging cord handle 16 may itself transmit an RF signal to the vehicle 12 instructing the vehicle to open the charge port door 24. As described previously, the RF signal from the charging cord handle 16 may include a charging cord identifier identifying the charging cord. The RF transceiver 34 at the vehicle 12 may receive the RF signal from the charging cord handle 16 and the controller 32 may verify the charging cord 14 is authorized for use with the vehicle 12 based on the charging cord identifier. If the charging cord 14 is authorized, the controller 32 may transmit a signal to the charge port module 41 instructing the charge port module to open the charge port door 24.

Figure 3:
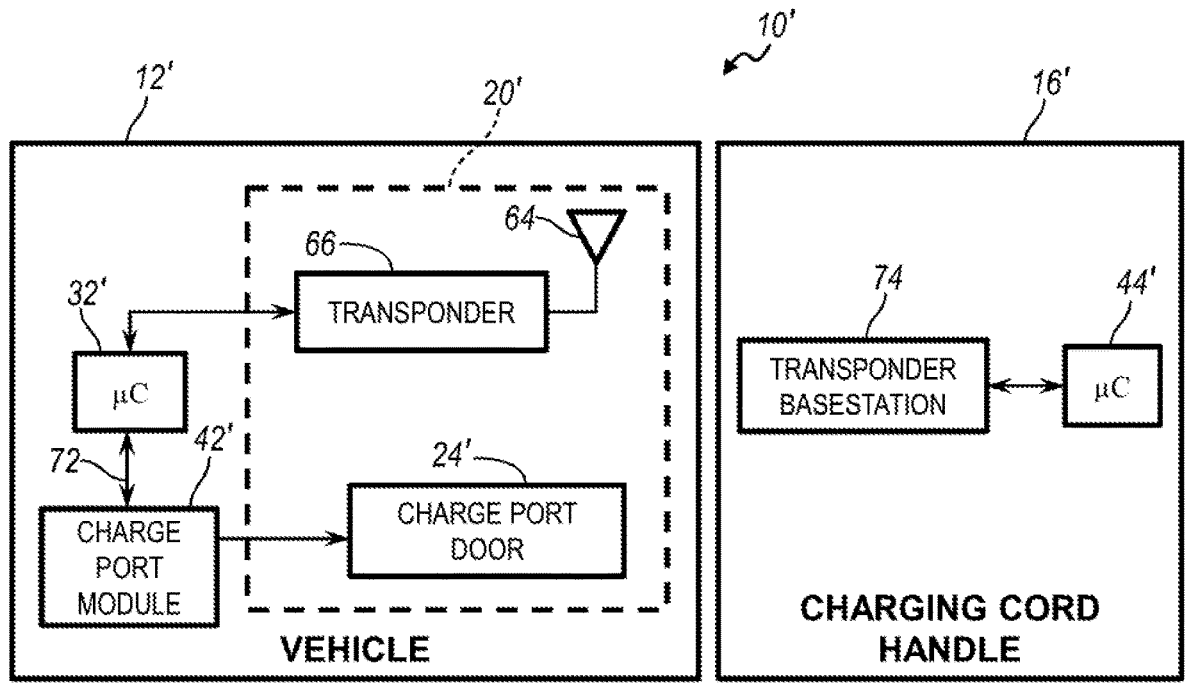
FIG. 3 is a block diagram of a charge port authorization system in accordance with one or more alternative embodiments of the present disclosure.

With reference now to FIG. 3, a block diagram of an alternative charge port authorization system 10' for a vehicle 12' using radio frequency identification (RFID) components is shown. The charge port authorization system 10' may include a charge port 20' having a charge port door 24', a coil antenna 64, and a transponder 66. The coil antenna 64 may be mounted in the charge port door 24' or nearby. The transponder 66 may be an integrated circuit. The charge port authorization system 10' may further include a controller 32' coupled to the transponder 66 and a charge port module 42'. The controller 32' may be connected to the charge port module 42' via a bus 72, such as a controller area network (CAN) or local interconnect network (LIN) bus. As previously described, the charge port module 42' may be coupled to the charge port door 24' for actively unlocking the charge port door to provide access to the charge port 20'.

The controller 32' may be configured to establish a wireless communication link with a charging cord handle 16' having a transponder basestation 74 when the charging cord handle is near the charge port 20'. For example, the transponder basestation 74 in the charging cord handle 16' may activate a magnetic field in response to sensing movement of the charging cord handle. The wireless communication link may be established upon detecting, using the coil antenna 64 and the transponder 66 in the charge port 20', the magnetic field from the charging cord handle 16'. The wireless communication link with the charging cord handle 16' may be established when the transponder basestation 74 is less than approximately 10 cm from the transponder 66 (i.e., charge port door). In some embodiments, the transponder basestation 74 in the charging cord handle 16' may be coupled to its own controller 44'.

The controller 32' may be further configured to transmit a signal to the charge port module 42' instructing the charge port module to open the charge port door 24' after the wireless communication link is established. According to one or more embodiments, the controller 32' may be configured to transmit the signal to the charge port module 42' instructing the charge port module to open the charge port door 24' when the wireless communication link is broken. For instance, when a user moves the charging cord handle 16' back away from the charge port door 24', the wireless communication link may terminate causing the charge port door to open. In this manner, hitting the charge port door 24' with the charging cord handle 16' may be avoided.

The operation for providing access to the charge port 20' may be made generic for every car or specific to a particular vehicle by mating. As in the other embodiments described, the controller 32' may be further configured receive a charging cord identifier from the transponder basestation 74 in the charging cord handle 16'. The controller 32' may then transmit the signal to the charge port module 42' instructing the charge port module to open the charge port door 24' in response to the charging cord identifier being associated with an authorized charging cord.

Figure 4:
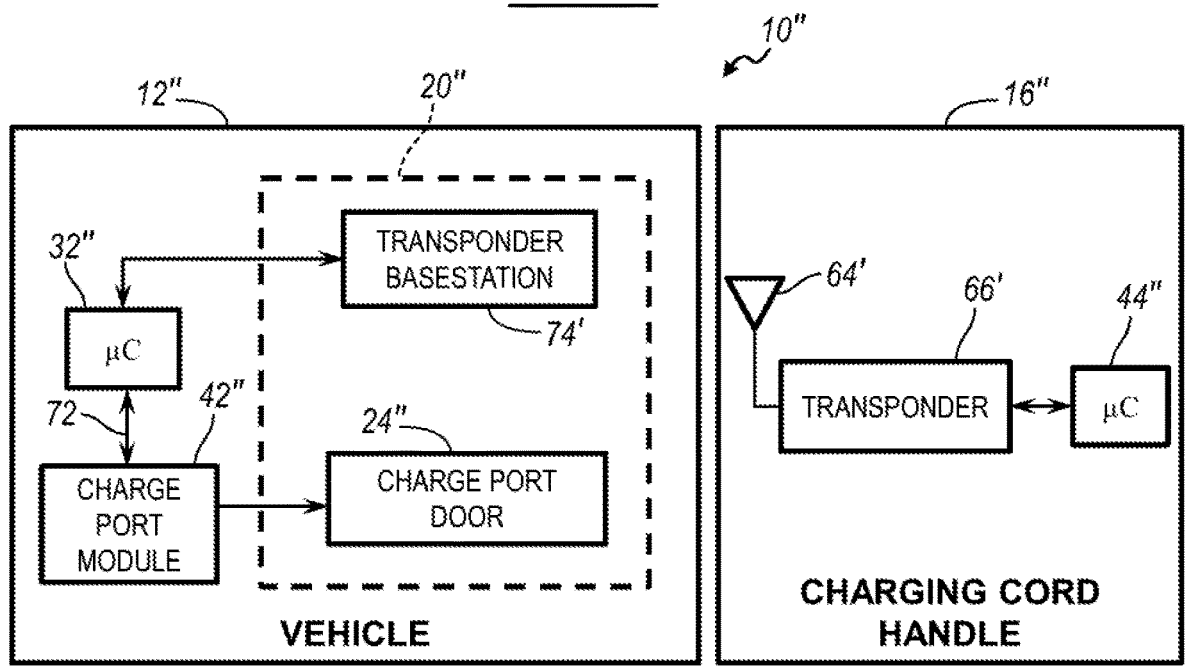
FIG. 4 a block diagram of a charge port authorization system in accordance with yet another embodiment of the present disclosure.

With reference now to FIG. 4, a block diagram of yet another alternative charge port authorization system 10" using radio frequency identification (RFID) components is shown. This embodiment is similar to the embodiment in FIG. 3. However, a coil antenna 64' and a transponder 66' may be embedded in a charging cord handle 16", while a transponder basestation 74' is embedded in a charge port 20" of an electric vehicle 12". The vehicle 12" may include a controller 32" in communication with the transponder basestation 74' and a charge port module 42". Similarly, the transponder 66' in the charging cord handle 16" may be coupled to a controller 44". The controller 32" may be connected to the charge port module 42" via the bus 72. As previously described, the charge port module 42''' may be coupled to the charge port door 24" for actively unlocking the charge port door to provide access to the charge port 20".

In one or more embodiments, a wireless communication link may be established between the vehicle 12" and the charging cord handle 16" of the charging cord. For instance, the transponder basestation 74' may transmit a continuous wave carrier signal, which can be received by the charging cord handle 16". The continuous wave signal may be used by the charging cord handle 16" to power or energize the transponder 66'. The transponder 66' may transmit data back to the vehicle 12" by modulating the continuous wave signal. Accordingly, the vehicle 12" may receive a wireless signal from the charging cord handle 16" by monitoring, via the transponder basestation 74', a modulation of the continuous wave signal applied by the transponder 66'. The data in this wireless signal (i.e., the modulated continuous wave signal) may include the charging cord identifier.

Figure 5:
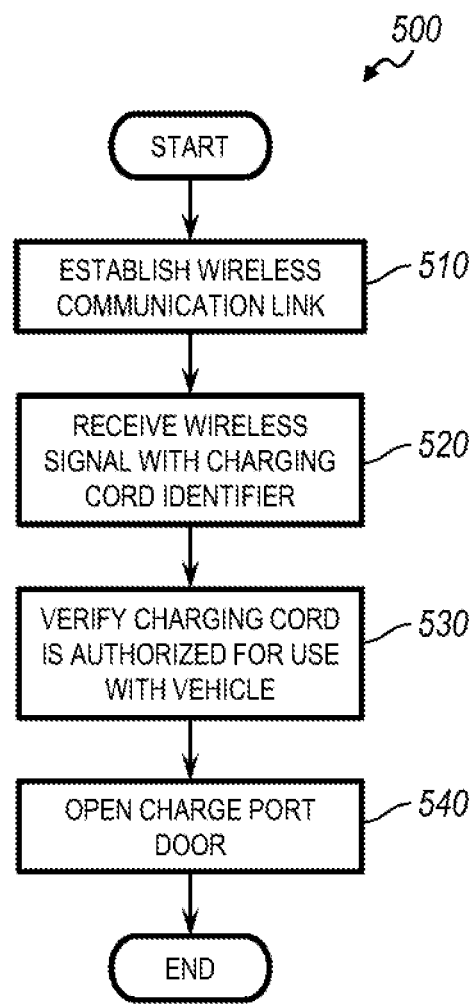
FIG. 5 is a flow chart depicting a method for wirelessly authorizing access to a charge port for an electric vehicle in accordance with one or more embodiments of the present disclosure.

FIG. 5 is a sample flowchart depicting a method 500 for wirelessly authorizing access to a charge port 20 for an electrified vehicle 12. As provided at step 510, the vehicle 12 may establish a wireless communication link with a charging cord 14. According to one or more embodiments of the present disclosure, establishing a wireless communication link with the charging cord 14 may include transmitting, from the vehicle 12, a polling signal and receiving, at the vehicle 12, a response signal from the charging cord 14 in response to the polling signal. The polling signal may be an LF polling signal transmitted from the LF transceiver 36. The response signal may be an RF response signal (e.g., a UHF response signal) received by the RF transceiver 34 (e.g., UHF transceiver) from the charging cord handle 16. In certain embodiments, the polling signal used for authorizing access to the charge port 20 may be the same as a polling signal used for a passive entry system.

According to one or more additional embodiments, establishing a wireless communication link with a charging cord 14 may include receiving, at the vehicle 12, a polling signal from the charging cord 14 and transmitting, from the vehicle 12, a response signal to the charging cord 14 in response to the polling signal. Moreover, the vehicle 12 may measure the signal strength of the polling signal and send the response signal in response to the signal strength exceeding a predetermined signal strength level.

As provided at step 520, the vehicle 12 may receive, from the charging cord 14, a wireless signal including a charging cord identifier. The wireless signal, including the charging cord identifier, may include specific instructions instructing the vehicle 12 to open the charge port door 24. In certain embodiments, the response signal and wireless signal including the charging cord identifier may be the same signal or part of the same signal transmission. At step 530, the vehicle 12, via the controller 32, may verify the charging cord 14 is authorized for use with the vehicle 12 based on the charging cord identifier. At step 540, the vehicle 12 may open the charge port door 24 in response to the charging cord identifier being associated with an authorized charging cord.

Referring back to step 510, according to one or more additional embodiments, establishing a wireless communication link with a charging cord 14 may include detecting, using a coil antenna 64 and a transponder 66 in the charge port 20', a magnetic field from a charging cord handle 16' having a transponder basestation 74. Alternatively, establishing a wireless communication link with a charging cord 14 may include generating a magnetic field using a transponder basestation 74' in the charge port 20" and connecting to a charging cord handle 16" having a transponder 66' when the charging cord handle 16 is range of the transponder basestation 74'. The communication link may be established, for instance, by transmitting a continuous wave signal to the charging cord, which may be used to energize the transponder 66'. Further, the wireless signal received from the charging cord 14 may be received by monitoring, via the transponder basestation 74', a modulation of the continuous wave signal by the transponder 66' in the charging cord handle 16".

Moreover, referring to step 540, opening the charge port door 24 in response to the charging cord identifier being associated with an authorized charging cord may occur after the wireless communication link is broken signifying that the charging cord handle 16 has been moved away from the charge port 20.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for wirelessly authorizing access to a charge port of an electrified vehicle comprising:
    establishing a wireless communication link with a charging cord, the charging cord being external to the electrified vehicle;
    receiving, from the charging cord, a wireless signal including a charging cord identifier;
    verifying the charging cord is authorized for use with the electrified vehicle based on the charging cord identifier; and
    opening a charge port door on the electrified vehicle in response to the charging cord identifier received from the charging cord being associated with an authorized charging cord.

2. The method of claim 1, wherein establishing a wireless communication link with a charging cord comprises:
    transmitting, from the vehicle, a polling signal; and
    receiving, at the vehicle, a response signal from the charging cord in response to the polling signal.

3. The method of claim 2, wherein the polling signal is a low-frequency (LF) polling signal and the response signal is an ultra high-frequency (UHF) response signal.

4. The method of claim 2, wherein the polling signal used for authorizing access to the charge port is the same as a polling signal used for a passive entry system.

5. The method of claim 2, wherein the response signal and wireless signal including the charging cord identifier is part of a same signal transmission.

6. The method of claim 1, wherein the wireless signal, including the charging cord identifier, includes specific instructions instructing the vehicle to open a charge port door.

7. The method of claim 1, wherein establishing a wireless communication link with a charging cord comprises:
    receiving, at the vehicle, a polling signal from the charging cord; and
    transmitting, from the vehicle, a response signal to the charging cord in response to the polling signal.

8. The method of claim 7, further comprising:
    measuring the signal strength of the polling signal, wherein the response signal is sent in response to the signal strength exceeding a predetermined signal strength level.

9. The method of claim 1, wherein establishing a wireless communication link with a charging cord comprises:
    detecting, using a coil antenna and a transponder in the charge port, a magnetic field from a charging cord handle having a transponder basestation.

10. The method of claim 9, wherein opening the charge port door in response to the charging cord identifier being associated with an authorized charging cord occurs after the wireless communication link is broken signifying that the charging cord handle has been moved away from the charge port.

11. The method of claim 1, wherein establishing a wireless communication link with a charging cord comprises transmitting a continuous wave signal to the charging cord, wherein the wireless signal received from the charging cord is received by monitoring a modulation of the continuous wave signal by a transponder in the charging cord.

12. The method of claim 1, wherein establishing a wireless communication link with a charging cord comprises:
    generating a magnetic field using a transponder basestation in the charge port; and connecting to a charging cord handle having a transponder when the charging cord handle is range of the transponder basestation.

13. A charge port authorization system for a vehicle comprising: a low-frequency (LF) transmitter configured to broadcast an LF signal;
    an ultra-high-frequency (UHF) transceiver configured to receive a UHF signal from a charging cord handle, the UHF signal including a charging cord identifier; and
    a controller configured to verify the charging cord is authorized for use with the vehicle to provide access to a charge port based on the charging cord identifier and transmit a signal to a charge port module instructing the charge port module to open a charge port door in response to the charging cord identifier being associated with an authorized charging cord.

14. The system of claim 13, wherein the LF signal is a polling signal.

15. The system of claim 14, wherein the UHF signal is a response signal configured to be received in response to the polling signal.

16. The system of claim 14, wherein the polling signal used for authorizing access to the charge port is the same as a polling signal used for a passive entry system.

17. A charge port authorization system for a vehicle comprising: a charge port including a charge port door, a coil antenna, and a transponder; and
    a controller configured to establish a wireless communication link with a charging cord handle having a transponder basestation when the charging cord handle is near the charge port, the controller being further configured to transmit a signal to a charge port module instructing the charge port module to open the charge port door after the wireless communication link is established.

18. The system of claim 17, wherein the controller is configured to transmit the signal to the charge port module instructing the charge port module to open the charge port door when the wireless communication link is broken.

19. The system of claim 17, wherein the controller is further configured receive a charging cord identifier from the transponder basestation in the charging cord handle and transmit the signal to the charge port module instructing the charge port module to open the charge port door in response to the charging cord identifier being associated with an authorized charging cord.

20. The system of claim 17, wherein the controller is configured to establish a communication link upon detecting, using the coil antenna and the transponder in the charge port, a magnetic field from the charging cord handle having the transponder basestation.

\* \* \* \* \*